US008565954B2

(12) United States Patent
Yeh et al.

(10) Patent No.: US 8,565,954 B2
(45) Date of Patent: Oct. 22, 2013

(54) VEHICLE MOTOR TEMPERATURE DETERMINATION

(75) Inventors: Chia-Chou Yeh, Gardena, CA (US); Daniel J. Berry, Macomb Township, MI (US); Paul F. Turnbull, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 60 days.

(21) Appl. No.: 13/267,755

(22) Filed: Oct. 6, 2011

(65) Prior Publication Data

US 2013/0090791 A1 Apr. 11, 2013

(51) Int. Cl.

| | |
|---|---|
| ***B60L 11/00*** | (2006.01) |
| ***B60K 17/00*** | (2006.01) |
| ***F16H 59/00*** | (2006.01) |
| ***G06G 7/48*** | (2006.01) |

(52) U.S. Cl.
USPC .................... 701/22; 180/339; 477/98; 703/8

(58) Field of Classification Search
USPC ............ 701/22; 165/272, 287, 233, 239, 247, 165/253, 254, 257, 292, 300; 477/72, 76, 477/97, 98; 180/65.21, 339; 703/7, 8; 318/432, 473, 641, 634, 434; 903/904
See application file for complete search history.

(56) References Cited

U.S. PATENT DOCUMENTS 7,615,951 B2 * 11/2009 Son et al. ...................... 318/432
2008/0196962 A1 * 8/2008 Capito .......................... 180/249

FOREIGN PATENT DOCUMENTS

JP 8284734 * 10/1996

OTHER PUBLICATIONS

F. Briz, et al, Temperature Estimation in Inverter-Fed Machines Using High-Frequency Carrier Signal Injection, IEEE Transactions on Industry Applications, May/Jun. 2008, pp. 799-808,vol. 44, No. 3.
Sang-Bin Lee et al, An Evaluation of Model-Based Stator Resistance Estimation for Induction Motor Stator Winding Temperature Monitoring, IEEE Transaction on Energy Conversion, Mar. 2002, pp. 7-15, vol. 17, No. 1.
Gao, Dalong, et al., Robotically Operated Vehicle Charging Station, U.S. Appl. No. 61/539,249, filed Sep. 26, 2011.
Perisic, Milun, et al., Systems and Methods for Providing Power to a Load Based Upon a Control Strategy, U.S. Appl. No. 13/222,961, filed Aug. 31, 2011.

* cited by examiner

*Primary Examiner* — Muhammad Shafi
(74) *Attorney, Agent, or Firm* — Ingrassia Fisher & Lorenz, P.C.

(57) ABSTRACT

Methods, systems, and vehicles are provided pertaining to the determination of a temperature of a vehicle motor having an ignition when the ignition is turned on following a period of time in which the ignition had been turned off. A memory stores a function having a boundary condition that comprises a prior temperature from when the ignition was turned off. A processor is coupled to the memory. The processor is configured to determine an amount of time for which the ignition has been turned on and determine the temperature of the motor using the function if the amount of time for which the ignition has been turned on is less than a predetermined threshold.

13 Claims, 4 Drawing Sheets

VEHICLE MOTOR TEMPERATURE DETERMINATION

TECHNICAL FIELD

The present disclosure generally relates to the field of vehicles and, more specifically, to methods and systems for determining a temperature of a motor of a vehicle.

BACKGROUND

Automobiles and various other vehicles depend on motor operation. During operation of the vehicle, various vehicle systems may utilize an estimated motor temperature for use in controlling operation of the vehicle systems. Certain techniques utilize a motor coolant temperature to approximate the motor temperature, for example when an ignition of the vehicle has recently been started. However, the motor coolant temperature may not always provide an optimal estimate for the motor temperature, for example if the ignition had been turned off for only a relatively short period of time before being turned back on and/or if the weather is relatively warm outside the vehicle.

Accordingly, it is desirable to provide improved methods for determining a motor temperature of a vehicle, for example for an initial estimate of the motor temperature after the ignition has been turned on. It is also desirable to provide improved systems for such estimation of a motor temperature of a vehicle. It is further desirable to provide improved vehicles that include such improved methods and systems for estimation of the motor temperature of the vehicle. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for determining a temperature of a motor of a vehicle having an ignition when the ignition is turned on following a period of time in which the ignition had been turned off. The method comprises the steps of determining an amount of time for which the ignition has been turned on and determining the temperature of the motor using a function if the amount of time for which the ignition has been turned on is less than a predetermined threshold. The function has a boundary condition comprising a prior temperature from when the ignition was turned off.

In accordance with another exemplary embodiment, a system is provided for determining a temperature of a motor of a vehicle having an ignition when the ignition is turned on following a period of time in which the ignition had been turned off. The system comprises a memory and a processor. The memory is configured to store a function having a boundary condition. The boundary condition comprises a prior temperature from when the ignition was turned off. The processor is coupled to the memory, and is configured to determine an amount of time for which the ignition has been turned on, and determine the temperature of the motor using the function if the amount of time for which the ignition has been turned on is less than a predetermined threshold.

In accordance with a further exemplary embodiment, a vehicle is provided. The vehicle comprises a drive system, a motor, an ignition, and a control system. The motor is coupled to the drive system. The ignition is coupled to the motor. The control system is coupled to the motor and the ignition, and comprises a memory and a processor. The memory is configured to store a function having a boundary condition. The boundary condition comprises a prior temperature from when the ignition was turned off. The processor is coupled to the memory, and is configured to determine an amount of time for which the ignition has been turned on, and determine the temperature of the motor using the function if the amount of time for which the ignition has been turned on is less than a predetermined threshold.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
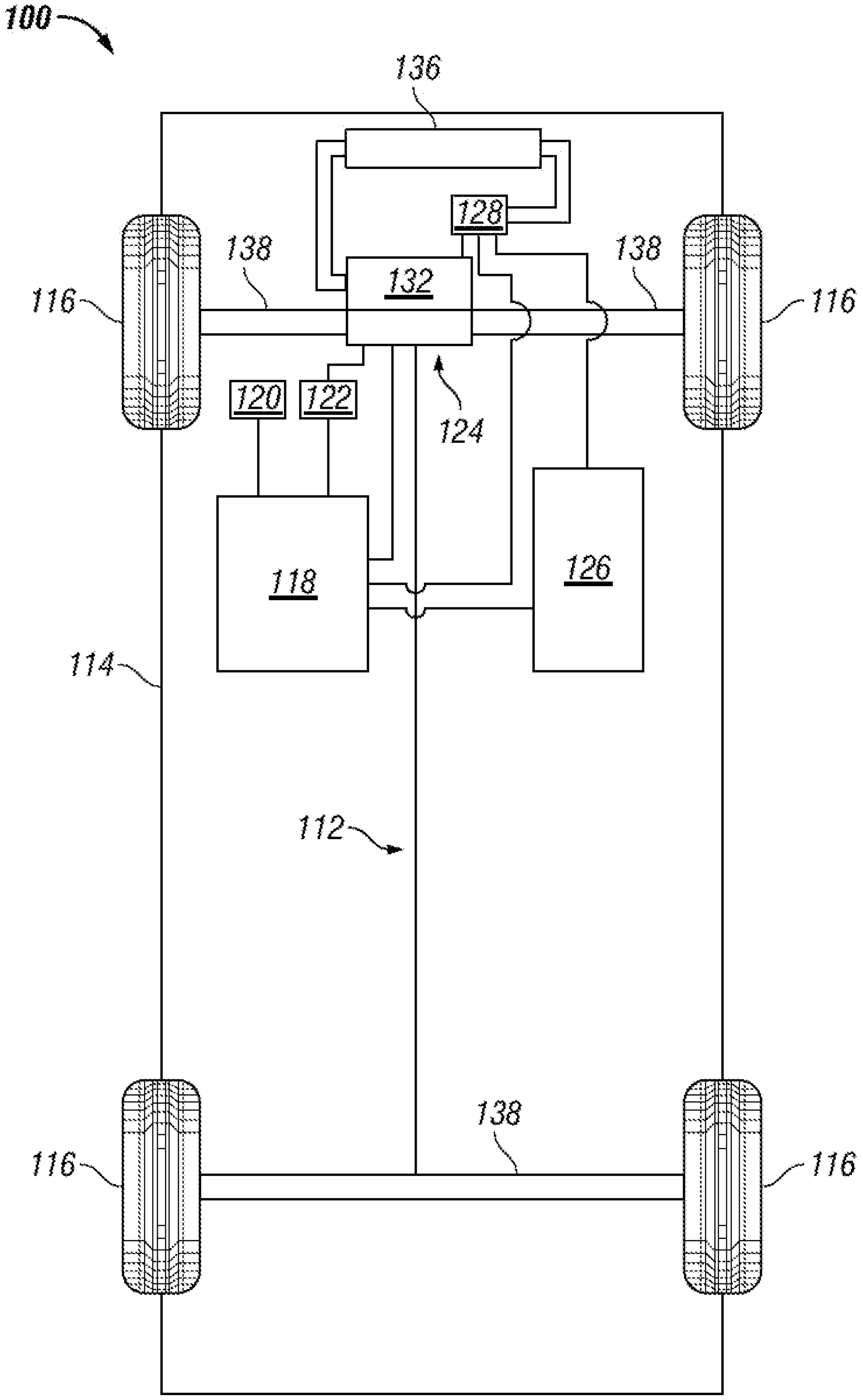
FIG. 1 is a functional block diagram of a vehicle that includes a motor system having a motor and a controller for determining a temperature of the motor, in accordance with an exemplary embodiment.

FIG. 1 illustrates a vehicle 100, or automobile, according to an exemplary embodiment. As described in greater detail further below, the vehicle 100 includes a motor system 132 with a control system for estimating a motor temperature for the vehicle when an ignition of the motor system 132 is turned on at the beginning of a current drive cycle, using a first order-decay function with a boundary condition that comprises a prior temperature from when the ignition was turned off.

As depicted in FIG. 1, the vehicle 100 includes a chassis 112, a body 114, four wheels 116, an electronic control system 118, a steering system 120, a braking system 122, and a propulsion system 124. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

In certain embodiments (for example, in which the vehicle 100 is a hybrid electric vehicle), the vehicle 100 also includes an energy storage system (ESS) 126 that is mounted on the chassis 112 and is electrically connected to an inverter 128.

The ESS 126 preferably comprises a battery having a pack of battery cells. In one embodiment, the ESS 126 comprises a lithium iron phosphate battery, such as a nanophosphate lithium ion battery. Together the ESS 126 and propulsion system(s) 124 provide a drive system to propel the vehicle 100.

The steering system 120 is mounted on the chassis 112, and controls steering of the wheels 116. The steering system 120 includes a steering wheel and a steering column (not depicted). The steering wheel receives inputs from a driver of the vehicle. The steering column results in desired steering angles for the wheels 116 via drive shafts 138 based on the inputs from the driver.

The braking system 122 provides braking for the vehicle 100. The braking system 122 includes a brake pedal (not depicted) for receiving inputs from a driver, and also includes brake units (not depicted) for providing braking torque and friction to stop or slow the vehicle. In addition, driver inputs are also obtained via an accelerator pedal (not depicted) of the vehicle.

The propulsion system 124 is mounted on the chassis 112, and drives the wheels 116. The propulsion system 124 includes the above-referenced motor system 132. As will be appreciated by one skilled in the art, the motor system 132 includes a transmission therein. The motor system 132 is integrated such that it is mechanically coupled to at least some of the wheels 116 through one or more of the drive shafts 138.

In certain embodiments, the propulsion system 124 may include separate systems for a combustion engine and an electric motor. The vehicle 100 may also incorporate any one of, or combination of, a number of different types of electrical propulsion systems and/or engines, such as, for example, a gasoline fueled combustion engine, a "flex fuel vehicle" (FFV) engine (i.e., using a mixture of gasoline and ethanol), a gaseous compound (e.g., hydrogen or natural gas) fueled engine, a combustion/engine hybrid engine, and an engine. In certain embodiments, the vehicle 100 also includes a radiator 136 that is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the motor system 132.

Figure 2:
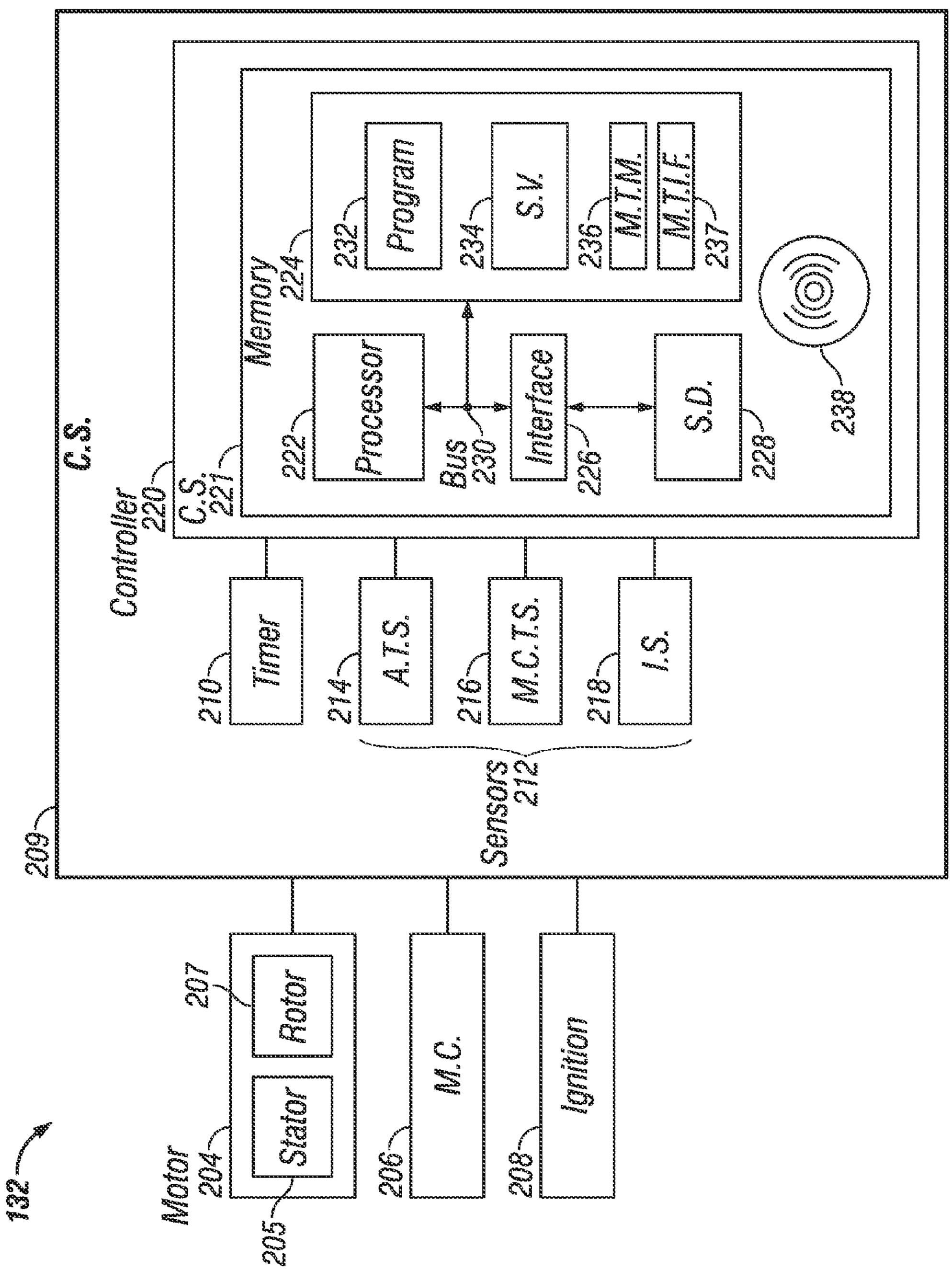
FIG. 2 is a functional block diagram of a motor system, including a control system for determining a motor temperature, for example for a vehicle such as an automobile, and that can be used in connection with the motor system and vehicle of FIG. 1, in accordance with an exemplary embodiment.

With reference to FIG. 2, a functional block diagram depicts the motor system 132 of FIG. 1 in greater detail, in accordance with an exemplary embodiment. As depicted in FIG. 2, the motor system 132 includes a motor 204. The motor 204 includes a stator 205 (including conductive coils) and a rotor 207 (including a ferromagnetic core). The stator 205 and/or the rotor 207 may include electromagnetic poles, as is commonly understood.

The motor 204 is cooled by motor coolant 206 (for example, transmission fluid) as part of the motor system 132. In addition, an ignition 208 of the vehicle is turned on and off (for example by a driver turning an ignition key on and off), also preferably as part of the motor system 132. The ignition 208 is coupled to the motor 204, and controls an operational state thereof. Specifically, the motor 204 is in an operational, or "on" state, when the ignition is turned on (also referred to herein as being keyed on). Conversely, the motor 204 is in a non-operational, or "off" state, when the ignition is turned off (also referred to herein as being keyed off).

The control system 209 includes a timer 210, sensors 212, and a controller 220. The timer 210 measures a first amount of time from which the ignition 208 has been keyed back on again (or turned on) during vehicle start-up. Specifically, the first amount of time comprises a measure of how long the ignition 208 has been keyed on (or turned on) during the current iteration or drive cycle. The timer 210 also measures a second amount of time during which the ignition 208 is turned off before the engine is turned on again in a current iteration or drive cycle. Specifically, the timer 210 preferably measures the second amount of time beginning when the ignition 208 is keyed off (or turned off) and ending when the ignition 208 is keyed back on again (or turned on). The timer 210 provides information regarding the measured values to the controller 220 for ascertaining the first and second amounts of time for use in determining temperature values for the motor 204.

The sensors 212 include an ambient temperature sensor 214, a motor coolant temperature sensor 216, and an ignition sensor 218. The ambient temperature sensor 214 measures an ambient temperature surrounding the vehicle, and provides these measurements and/or information pertaining thereto to the controller 220 for processing and for use in determining temperature values for the motor 204. The motor coolant temperature sensor 216 measures a temperature of the motor coolant 206 and provides these measurements and/or information pertaining thereto to the controller 220 for processing and for use in determining temperature values for the motor 204. The ignition sensor 218 senses whether the ignition 208 is turned on or off and provides signals and/or information pertaining thereto to the controller 220 for processing and for use in determining temperature values for the motor 204.

The controller 220 is coupled to the timer 210, the ambient temperature sensor 214, the motor coolant temperature sensor 216, and the ignition sensor 218. The controller 220 receives the signals as to whether the ignition 208 of the vehicle is turned on or off from the ignition sensor 218, and also receives information pertaining to the above-referenced first and second amounts of time from the timer 210. As used throughout this application, an amount of time also denotes a time period or duration of time. In addition, the controller 220 receives the values of the ambient temperature from the ambient temperature sensor 214 and the motor coolant temperature from the motor coolant temperature sensor 216, respectively. The controller 220 processes these various signals and values in determining temperatures of the motor 204. In so doing, the controller 220 utilizes first order initialization functions each having a boundary condition comprising a prior temperature from when the ignition was turned off, preferably in executing the steps of the process 300 described further below in connection with FIG. 3.

As depicted in FIG. 2, the controller 220 comprises a computer system 221. In certain embodiments, the controller 220 may also include one or more of the timer 210, sensors 212, and/or one or more other devices. In addition, it will be appreciated that the controller 220 may otherwise differ from the embodiment depicted in FIG. 2, for example in that the controller 220 may be coupled to or may otherwise utilize one or more remote computer systems and/or other control systems.

In the depicted embodiment, the computer system 221 is coupled to the timer 210 and each of the sensors 212. The computer system 221 includes a processor 222, a memory 224, an interface 226, a storage device 228, and a bus 230. The processor 222 performs the computation and control functions of the computer system 221 and the controller 220, and may comprise any type of processor or multiple processors, single integrated circuits such as a microprocessor, or any suitable number of integrated circuit devices and/or circuit boards working in cooperation to accomplish the functions of a processing unit. During operation, the processor 222 executes one or more programs 232 contained within the memory 224 and, as such, controls the general operation of the controller 220 and the computer system 221, preferably in executing the steps of the process 300 described further below in connection with FIG. 3.

The memory 224 can be any type of suitable memory, including, for example, various types of dynamic random access memory (DRAM) such as SDRAM, the various types of static RAM (SRAM), and the various types of non-volatile memory (PROM, EPROM, and flash). The bus 230 serves to transmit programs, data, status and other information or signals between the various components of the computer system 221. In a preferred embodiment, the memory 224 stores the above-referenced program 232 along with one or more stored values 234, a motor temperature model 236, and motor temperature initialization functions 237. In certain examples, the memory 224 is located on and/or co-located on the same computer chip as the processor 222.

The interface 226 allows communication to the computer system 221, for example from a system driver and/or another computer system, and can be implemented using any suitable method and apparatus. It can include one or more network interfaces to communicate with other systems or components. The interface 226 may also include one or more network interfaces to communicate with technicians, and/or one or more storage interfaces to connect to storage apparatuses, such as the storage device 228.

The storage device 228 can be any suitable type of storage apparatus, including direct access storage devices such as hard disk drives, flash systems, floppy disk drives and optical disk drives. In one exemplary embodiment, the storage device 228 comprises a program product from which memory 224 can receive a program 232 that executes one or more embodiments of one or more processes of the present disclosure, such as the steps of the process 300 described further below in connection with FIG. 3. In another exemplary embodiment, the program product may be directly stored in and/or otherwise accessed by the memory 224 and/or a disk (e.g. disk 238), such as that referenced below.

The bus 230 can be any suitable physical or logical means of connecting computer systems and components. This includes, but is not limited to, direct hard-wired connections, fiber optics, infrared and wireless bus technologies. During operation, the program 232 is stored in the memory 224 and executed by the processor 222.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 222) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 221 may also otherwise differ from the embodiment depicted in FIG. 2, for example in that the computer system 221 may be coupled to or may otherwise utilize one or more remote computer systems and/or other control systems.

Figure 3:
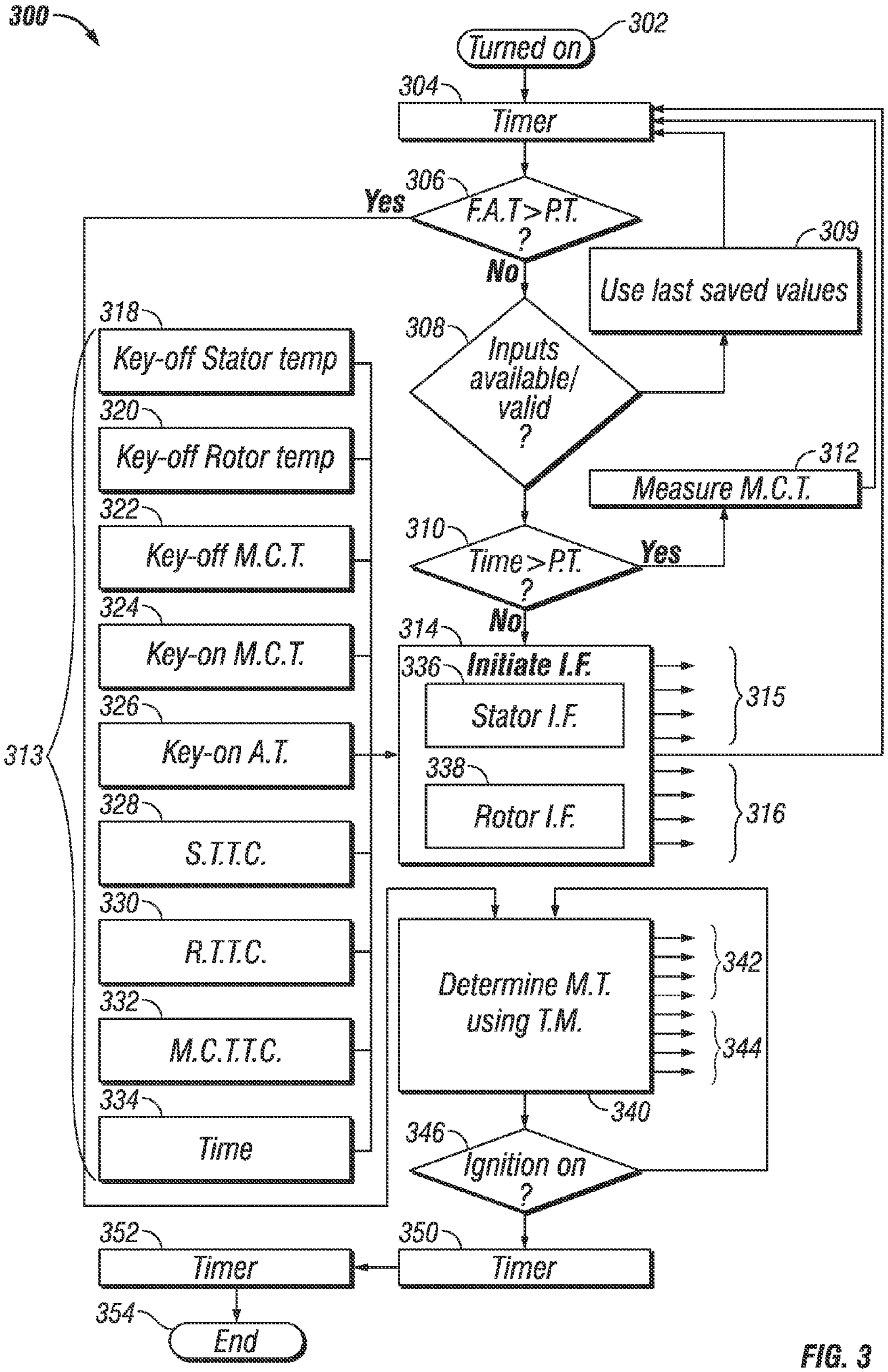
FIG. 3 is a flowchart of a process for determining a motor temperature of a vehicle, and that can be used in connection with the vehicle of FIG. 1, the motor system of FIGS. 1 and 2, and the control system of FIG. 2, in accordance with an exemplary embodiment.

FIG. 3 is a flowchart of a process 300 for determining a motor temperature of a vehicle, in accordance with an exemplary embodiment. The process 300 estimates a motor temperature for a vehicle when an ignition of the motor system is turned on at the beginning of a current drive cycle, using a first order-decay function with a boundary condition that comprises a prior temperature from when the ignition was turned off. The process 300 can preferably be utilized in connection with the vehicle 100 of FIG. 1, the motor system 132 of FIGS. 1 and 2, and the control system 209 of FIG. 2 in accordance with an exemplary embodiment, and references to a vehicle, motor system, control system, and/or components thereof preferably correspond to those referred to in FIGS. 1 and 2.

As depicted in FIG. 3, the process 300 begins when a determination is that an ignition of the vehicle has been turned on (step 302). The ignition preferably corresponds to the ignition 208 of FIG. 2. This determination is preferably made by the controller 220 of FIG. 2, most preferably by the processor 222 thereof, based on signals or information provided thereto by the ignition sensor 218 of FIG. 2.

A timer is initiated while the ignition is turned on (step 304). Preferably, the processor 222 controls the timer 210 to run once the ignition 208 is turned on, to determine a first amount of time for which the ignition 208 has been turned on during the current ignition or drive cycle.

A determination is then made as to whether the first amount of time of step 304 exceeds a predetermined threshold (step 306). The predetermined threshold of step 306 comprises a predetermined amount of time such that, if the ignition is not turned off for at least this predetermined amount of time, the inputs are not likely to be available for a thermal model (described further below in connection with step 340 and also in connection with FIG. 4) used in determining motor temperature. In one embodiment, the predetermined threshold of step 306 is equal to approximately one hundred fifty milliseconds (150 ms). The predetermined threshold of step 306 is preferably stored in the memory 224 of FIG. 2 as one of the stored values 234 of FIG. 2. The determination of step 306 is preferably made by the controller 220 of FIG. 2, most preferably by the processor 222 thereof.

If it is determined in step 306 that the first amount of time of step 304 is greater than or equal to the predetermined threshold of step 306, then the process proceeds to step 340, described further below, and the motor temperature is determined using the thermal model. Conversely, if it is determined in step 306 that the first amount of time of step 304 is less than the predetermined threshold, then the process proceeds to step 308, described directly below.

During step 308, a determination is made as to whether all inputs for applicable initialization equations (or functions) are available and valid. Preferably, this determination is made with respect to both a stator initialization equation and a rotor initialization equation. In one example, the stator and rotor initialization equations (also referred to herein as functions) use ambient temperature as a boundary condition, and include the following inputs: an estimated stator temperature at ignition key-off, an estimated rotor temperature at ignition key-off, an ambient temperature at ignition key-off, a stator thermal time constant, a rotor thermal time constant, and an amount of time in which the ignition has been keyed off (also referred to herein as a second amount of time or a key-off time). In another example, the stator and rotor initialization equations use motor coolant temperature as a boundary condition, and include the following inputs: an estimated stator temperature at ignition key-off, an estimated rotor temperature at ignition key-off, a motor coolant temperature at ignition key-off, a motor coolant temperature at ignition key-on, a stator thermal time constant, a rotor thermal time constant, a motor coolant time constant, and an amount of time in which the ignition has been keyed off (also referred to herein as a second amount of time or a key-off time). These equations will be described in greater detail further below in connection with step 314. The determination of step 308 is preferably made by the controller 220 of FIG. 2, most preferably by the processor 222 thereof. In a preferred embodiment, the stator and rotor temperatures at key-off are estimated values that are then stored in memory, and the motor coolant temperature is a measured value obtained via a temperature sensor.

If it is determined in step 308 that one or more of the applicable inputs are unavailable and/or invalid, then the last saved estimated temperature values of the motor are used as the initial temperature conditions for the thermal model (step 309). Specifically, during step 309, the rotor and stator temperature values are set equal to the most recent values stored in the memory 224 of FIG. 2. Preferably, the most recent stored values were obtained and stored in memory during step 350 (described further below) when the ignition was keyed off at the end of a most recent prior ignition cycle. Step 309 is preferably implemented by the controller 220 of FIG. 2, most preferably by the processor 222 thereof.

If it is determined in step 308 that one or more of the applicable inputs are unavailable and/or invalid, then the last saved estimated temperature values of the motor are used as the initial temperature conditions for the thermal model (step 309). Specifically, during step 309, the temperature values of the rotor and stator (preferably, corresponding to the stator 205 and the rotor 207 of FIG. 2) are set equal to the most recent values stored in the memory 224 of FIG. 2. Preferably, the most recent stored values were obtained and stored in memory during step 350 (described further below) when the ignition was keyed off at the end of a most recent prior ignition cycle. Step 309 is preferably implemented by the controller 220 of FIG. 2, most preferably by the processor 222 thereof. Following step 309, the process returns to step 304, described above.

Conversely, if it is determined in step 308 that all of the applicable inputs are available and valid, than a determination is then made as to whether an amount of time that the ignition has been turned off exceeds a predetermined threshold (step 310). The amount of time that the engine has been turned off (also referenced herein as the second amount of time) is determined based on a timer (preferably, the timer 210 of FIG. 2) that began running when the ignition was turned off (as described further below in connection with step 352) in a most recent prior iteration or ignition cycle. The predetermined threshold of step 310 comprises a predetermined amount of time such that, if the ignition is not turned off for at least this predetermined amount of time, the motor temperature is not likely to have cooled enough to approach the motor coolant temperature. In one embodiment, the predetermined threshold of step 310 is calculated by multiplying a constant factor (k) by a time constant (τ). The constant (k) preferably varies between three (3) to five (5), and the time constant (τ) preferably varies between 10 to 60 minutes (which is motor-specific in a preferred embodiment). The predetermined threshold and/or the respective constant factor (k) and time constant (τ), are preferably stored in the memory 224 of FIG. 2 as stored values 234 thereof. The determination of step 310 is preferably made by the controller 220 of FIG. 2, most preferably by the processor 222 thereof.

If it is determined in step 310 that the amount of time that the ignition has been turned off exceeds the predetermined threshold of step 310, then the motor temperature is assumed to have converged to the motor coolant temperature. The motor coolant temperature is then measured (step 312), preferably by the motor coolant temperature sensor 216 of FIG. 2, for use as an initial temperature condition for the motor. The process then proceeds to step 304, described below.

Conversely, if it is determined in step 310 that the amount of time that the ignition has been turned off is less than or equal to the predetermined threshold of step 310, then initialization functions are implemented (step 314). Specifically, a stator initialization function 336 is implemented to determine an estimated initial condition for a stator of the motor (preferably, corresponding to the stator 205 of FIG. 2), and a rotor initialization function 338 is implemented to determine an estimated initial condition for a rotor of the motor (preferably, corresponding to the rotor 207 of FIG. 2). The stator initialization function 336 and the rotor initialization function 338 preferably each comprise a first order decay function having a boundary condition that is represented by a temperature from when the ignition is keyed off, most preferably at the end of an immediately prior ignition cycle of the vehicle.

During step 314, the stator and rotor initialization functions 336, 338 are retrieved from memory, and various inputs 313 are provided for the respective initialization functions 336, 338. Specifically, the stator and rotor initialization functions 336, 338 are preferably stored in the memory 224 of FIG. 2 as initialization functions 237 thereof, and are preferably retrieved from the memory 224 by the processor 222 of FIG. 2. The stator and rotor initialization functions 336, 338 are implemented and run by the processor 222 using the inputs 313 in order to generate initial stator temperature values 315 and initial rotor temperature values 316.

As depicted in FIG. 3, in step 314, the inputs 313 for the stator and rotor initialization functions 336, 338 may include the following: a stator temperature at ignition key-off 318 during an immediately prior ignition cycle, a rotor temperature at ignition key-off 320 during an immediately prior ignition cycle, a motor coolant temperature at ignition key-off 322 during an immediately prior ignition cycle, a motor coolant temperature at ignition key-on 324 during the current ignition cycle, an ambient temperature (preferably, comprising an ambient temperature outside the vehicle and in proximity to the vehicle) at ignition key-off 326 during an immediately prior ignition cycle, a stator thermal time constant 328, a rotor thermal time constant 330, a motor coolant thermal time constant 332, and a amount of time in which the ignition has been keyed off 334.

In a first exemplary embodiment of step 314, the stator and rotor initialization functions 336, 338 use the ambient temperature 326 as the boundary condition. Specifically, in this first exemplary embodiment, the stator initialization function 336 comprises the following equation (Equation 1):

$$StatorInitTemp = (T_{s\_KeyOff} - T_{ambient\_KeyOff})e^{-\frac{T_{Off}}{\tau_s}} + T_{ambient\_KeyOff}$$

and the rotor initialization function 338 comprises the following equation (Equation 2):

$$RotorInitTemp = (T_{r\_Key\text{-}Off} - T_{ambient\_KeyOff})e^{-\frac{T_{Off}}{\tau_r}} + T_{ambient\_KeyOff}$$

in which the inputs to Equations 1 and 2 are denoted as follows:

$T_{s\_KeyOff}$=Key-Off Stator Estimated Temperature $T_{r\_KeyOff}$=Key-Off Rotor Estimated Temperature $T_{ambient\_KeyOff}$=Key-Off Outside Ambient Temp $\tau_s$=Stator Thermal Time Constants $\tau_r$=Rotor Thermal Time Constants $T_{Off}$=Key-Off Time In a second exemplary embodiment of step 314, the stator and rotor initialization functions 336, 338 use the motor coolant temperatures 322,324 as the boundary conditions. Specifically, in this second exemplary embodiment, the stator initialization function 336 comprises the following equation (Equation 3):

$$StatorInitTemp = \frac{T_{coolant\_KeyOn}\left(1 - e^{-\frac{T_{Off}}{\tau_s}}\right) + T_{coolant\_KeyOff}\left(e^{-\left(\frac{1}{\tau_s}+\frac{1}{\tau_{coolant}}\right)T_{Off}} - e^{-\frac{T_{Off}}{\tau_{coolant}}}\right) - T_{s\_KeyOff}\left(e^{-\left(\frac{1}{\tau_s}+\frac{1}{\tau_{coolant}}\right)T_{Off}} - e^{-\frac{T_{Off}}{\tau_s}}\right)}{1 - e^{-\frac{T_{Off}}{\tau_{coolant}}}}$$

and the rotor initialization function 338 comprises the following equation (Equation 4):

$$RotorInitTemp = \frac{T_{coolant\_KeyOn}\left(1 - e^{-\frac{T_{Off}}{\tau_r}}\right) + T_{coolant\_KeyOff}\left(e^{-\left(\frac{1}{\tau_r}+\frac{1}{\tau_{coolant}}\right)T_{Off}} - e^{-\frac{T_{Off}}{\tau_{coolant}}}\right) - T_{r\_KeyOff}\left(e^{-\left(\frac{1}{\tau_r}+\frac{1}{\tau_{coolant}}\right)T_{Off}} - e^{-\frac{T_{Off}}{\tau_r}}\right)}{1 - e^{-\frac{T_{Off}}{\tau_{coolant}}}}$$

in which the inputs to Equations 3 and 4 are denoted as follows:

$T_{s\_KeyOff}$=Key-Off Stator Estimated Temperature $T_{r\_KeyOff}$=Key-Off Rotor Estimated Temperature $T_{coolant\_KeyOff}$=Key-Off Motor Coolant Temperature $T_{coolant\_KeyOn}$=Key-On Motor Coolant Temperature $\tau_s$=Stator Thermal Time Constants $\tau_r$=Rotor Thermal Time Constants $\tau_{Coolant}$=Motor Coolant Thermal Time Constants $T_{Off}$=Key-Off Time Regardless of the embodiment, the stator initialization function 336 preferably yields a plurality of initial stator temperature values 315 and a plurality of initial rotor temperature values 316. Each of the initial stator temperature values 315 represents a temperature at a particular node or location of the stator 205 of FIG. 2, such as those referenced further below in connection with FIG. 4. Each of the initial rotor temperature values 316 represents a temperature at a particular node or location of the rotor 207 of FIG. 2, such as those referenced further below in connection with FIG. 4. The initial stator temperature values 315 and the initial rotor temperature values 316 are subsequently utilized as inputs for the motor thermal model during step 340, described further below, after the amount of time in which the ignition has been keyed on exceeds the predetermined threshold of step 306. However, immediately after step 314 is performed, the process first proceeds to the above-referenced step 304, as the timer is incremented.

Once a determination is made in an iteration of step 306 that the amount of time in which the ignition has been keyed on (also referred to above as the first amount of time of step 306) is greater than or equal to the predetermined threshold of step 306, then a motor thermal model is implemented (step 340). The motor thermal model comprises a motor temperature model that estimates motor temperatures (including various stator temperatures at different nodes or regions of the stator of the motor, and various rotor temperatures at different nodes or regions of the rotor of the motor), utilizing various inputs. The motor thermal model of step 340 preferably comprises the motor temperature model 236 stored in the memory 224 of FIG. 2.

During step 340, the motor temperature model 236 of FIG. 2 is preferably retrieved from the memory 224 of FIG. 2 by the processor 222 of FIG. 2 and run by the processor 222. Specifically, various inputs are provided to the motor thermal model to generate various temperature values for the motor. The inputs for the motor thermal model may include the inputs 313 described above, as well as the initial stator temperature values 315 and the initial rotor temperature values 316 from step 314.

As a result, the motor thermal model generates various stator temperature values 342 and rotor temperature values 344 during step 340. Each stator temperature value 342 represents an estimated temperature at a particular node or region of the stator of the motor (preferably, pertaining to the stator 205 of FIG. 2), such as those described below in connection with FIG. 4. Similarly, each rotor temperature value 344 represents an estimated temperature at a particular node or region of the rotor of the motor (preferably, pertaining to the rotor 207 of FIG. 2), such as those described below in connection with FIG. 4.

Figure 4:
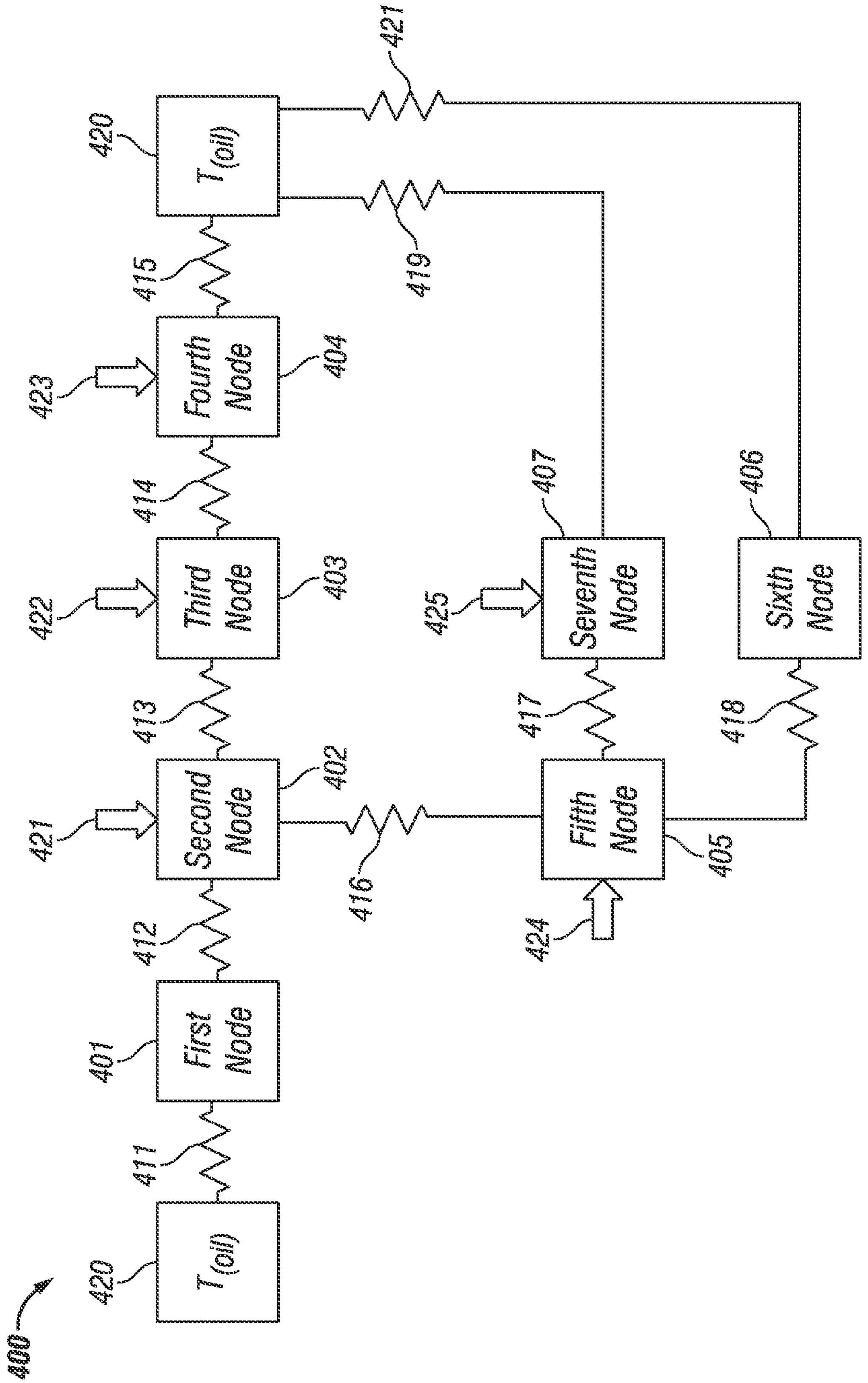
FIG. 4 provides a block diagram of an exemplary motor temperature model used in the process of FIG. 3, in accordance with an exemplary embodiment.

Turning now to FIG. 4, a block diagram is provided with respect to one exemplary motor temperature model that can be utilized for the process 300 of FIG. 3. In the embodiment of FIG. 4, the motor temperature model uses a thermal network-based approach to estimate motor temperature at various strategic locations/regions of the motor. Inputs to the motor temperature model preferably include motor coolant (oil) temperature, motor coolant (oil) flow rate, and power dissipation loss. The motor temperature model utilizes a combination of analytically calculated values and empirically determined heat transfer coefficients. As referenced herein and elsewhere throughout this application, the motor preferably corresponds to the motor 204 of FIG. 2, the stator preferably corresponds to the stator 205 of FIG. 2, and the rotor preferably corresponds to the rotor 207 of FIG. 2.

Specifically, as depicted in FIG. 4, the motor temperature model measures motor temperatures at first, second, third, fourth, fifth, sixth, and seventh nodes 401, 402, 403, 404, 405, 406, and 407, respectively, of the motor (depicted in FIG. 4 with respect to a motor coolant (oil) temperature, $T_{oil}$ 420). The first node 401 includes a non-flux producing portion of a stator stack of the motor. The second node 402 includes a flux producing portion of the stator stack. The third node 403 includes a copper metal disposed in a slot in the stator stack. The fourth node 404 includes a copper metal disposed in one or more end turns of the motor. The fifth node 405 includes a flux producing portion of the rotor core. The sixth node 406 includes a non-flux producing portion of the rotor core. The seventh node 407 includes a rotor end ring (for induction). The second node 402 is assigned with a stator iron loss 421. The third node 403 is assigned with a copper loss 422 in the slot. The fourth node 404 is assigned with a copper loss 423 in the end turn. The fifth node 405 is assigned with a rotor bar loss and a rotor iron loss 424. The seventh node 407 is assigned with an end ring loss 425.

The various motor temperatures are calculated using various thermal resistance values depicted in FIG. 4. A first thermal resistance 411 represents convective external heat transfer path between the motor coolant and the stator core. A second thermal resistance 412 represents conductive heat transfer path through the stator stack. A third thermal resistance 413 represents conductive heat transfer path between the stator stack and the copper windings in the motor slot. A fourth thermal resistance 414 represents conductive heat transfer path between the motor slot copper windings and the end-turn copper windings. A fifth thermal resistance 415 represents convective heat transfer path between the motor coolant and the end-turn copper windings. A sixth thermal resistance 416 represents convective heat transfer path through an air gap of the motor. A seventh thermal resistance 417 represents conductive heat transfer path through rotor bars (via induction). An eighth thermal resistance 418 represents conductive heat transfer path through the rotor core. A ninth thermal resistance 419 represents convective heat transfer path from a rotor end ring. A tenth thermal resistance 421 represents a convective heat transfer path through the rotor hub.

The motor temperature model utilizes heat transfer coefficients and power dissipation loss calculations, along with the motor geometry, as inputs in creating a system of differential equations for each node 401-407. The system of differential equations is solved, to thereby generate a temperature change at each node for a given time step. The temperature change for each node is added to the current or most recent temperature for that node from a most recent prior iteration. Once the running of the motor temperature model is complete, a current temperature is determined for each node of the motor.

After each iteration of step 340, a determination is made as to whether the ignition is still turned on (step 346). This determination is preferably made by the processor 222 of FIG. 2. If it is determined in step 346 that the ignition is still turned on, then the process returns to step 340, and additional iterations of the motor thermal model are conducted. Once it is determined that the ignition has been keyed off, various data values are stored (step 350). Preferably, during step 350, the inputs and outputs for the motor thermal model are each stored by the processor 222 of FIG. 2 into the memory 224 of FIG. 2 as stored values 234 thereof for use in a subsequent iteration after the ignition is keyed back on again to start a new ignition cycle.

In addition, a timer begins to run once the ignition is turned off (step 352). Specifically, once the ignition has been turned off, the timer begins running in order to measure an amount of time that the ignition has been keyed off (also referred to above as the second amount of time). Accordingly, during the next ignition cycle, the timer can be utilized for ascertaining this second amount of time that has elapsed from the time that the ignition has been keyed off in a present ignition cycle until the time that the ignition has been keyed back on again in the next, subsequent ignition cycle. In a preferred embodiment, during step 352, the timer 210 of FIG. 2 begins to run at ignition key-off based on instructions provided thereto by the processor 222 of FIG. 2.

Following steps 350 and 352, the process 300 terminates for the current ignition cycle (step 354). The process 300 begins again once a determination is made in step 302 in a subsequent ignition cycle that the ignition has been keyed back on again. Although the process 300 is described as terminating with step 354 for a current ignition cycle, the timer 210 of FIG. 2 continues to run, as described above, to measure the amount of time that the ignition has been keyed off, for use in the next ignition cycle.

Accordingly, improved methods, systems, and vehicles are provided. The improved methods, systems, and vehicles provide for improved determination of motor temperature values for a vehicle, particularly during an initialization period following ignition key-on for a new ignition or drive cycle. The methods, systems, and vehicles utilize first order initialization functions having a boundary condition comprising a prior temperature from when the ignition was keyed off, to provide for potentially improved motor temperature estimates at various nodes of the motor, for example in cases in which the ignition had been turned off for only a short duration of time and/or the ambient temperature is relatively warm.

It will be appreciated that the disclosed methods, systems, and vehicles may vary from those depicted in the Figures and described herein. For example, the controller 220 of FIG. 2 may be disposed in whole or in part in any one or more of a number of different vehicle units, devices, and/or systems. In addition, it will be appreciated that certain steps of the process 300 may vary from those depicted in FIG. 3 and/or described above in connection therewith. It will similarly be appreciated that certain steps of the process 300 may occur simultaneously or in a different order than that depicted in FIG. 3 and/or described above in connection therewith. It will likewise be appreciated that the motor thermal model may different from that depicted in FIG. 4 and/or as described above in connection therewith. It will similarly be appreciated that the disclosed methods and systems may be implemented and/or utilized in connection with any number of different types of automobiles, sedans, sport utility vehicles, trucks, any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A system for determining a temperature of a motor of a vehicle having an ignition when the ignition is turned on following a period of time in which the ignition had been turned off, the system comprising:

a memory configured to store a function having a boundary condition, the boundary condition comprising a prior temperature from when the ignition was turned off; and a processor coupled to the memory and configured to:

determine an amount of time for which the ignition has been turned on;

determine a second amount of time in which the ignition was turned off;

determine the temperature of the motor using the function and the boundary condition when the amount of time for which the ignition has been turned on is less than a predetermined threshold; and estimate the temperature of the motor to be equal to a temperature of the motor coolant when the second amount of time is greater than a second predetermined threshold.

2. The system of claim 1, wherein:

the memory is further configured to store a thermal model; and the processor is further configured to determine the temperature of the motor using the thermal model when the amount of time for which the ignition has been turned on is greater than the predetermined threshold.

3. The system of claim 1, wherein the boundary condition comprises an ambient temperature from when the ignition was turned off.

4. The system of claim 1, wherein the motor is cooled by a motor coolant, and the boundary condition comprises a temperature of the motor coolant from when the ignition was turned off.

5. The system of claim 1, wherein the motor is cooled by a motor coolant, and the processor is further configured to:

determine a second amount of time in which the ignition was turned off; and estimate the temperature of the motor to be equal to a temperature of the motor coolant when the second amount of time is greater than a second predetermined threshold.

6. The system of claim 1, wherein the motor comprises a stator and a rotor, and the system further comprises:

a first sensor configured to measure a first stator temperature of the stator from when the ignition was turned off;

a second sensor configured to measure a first rotor temperature of the rotor from when the ignition was turned off; and a third sensor configured to measure an ambient temperature from when the ignition was turned off;

wherein the processor is further configured to:

determine a current rotor temperature of the rotor using a first function, the first function using the second amount of time, the first rotor temperature, the ambient temperature, and a rotor thermal time constant; and determine a current stator temperature of the stator using a second function, the second function using the second amount of time, the first stator temperature, the ambient temperature, and a stator thermal time constant.

7. The system of claim 1, wherein the motor comprises a stator and a rotor and is cooled by a motor coolant, and the system further comprises:

a sensor configured to measure a first motor coolant temperature from when the ignition was turned off and a second motor coolant temperature from when the ignition is turned on;

wherein the processor is further configured to:

determine a second amount of time for which the ignition was turned off;

determine a current rotor temperature of the rotor using a first function, the first function using the second amount of time, the first motor coolant temperature, the second motor coolant temperature, a rotor thermal time constant, and a motor coolant thermal time constant; and determine a current stator temperature of the stator using a second function, the second function using the second amount of time, the first motor coolant temperature, the second motor coolant temperature, a stator thermal time constant, and the motor coolant thermal time constant.

8. A vehicle comprising:

a drive system;

a motor coupled to the drive system;

an ignition coupled to the motor; and a control system coupled to the motor and the ignition, the control system comprising:

a memory configured to store a function having a boundary condition, the boundary condition comprising a prior temperature from when the ignition was turned off; and a processor coupled to the memory and configured to:

determine an amount of time for which the ignition has been turned on;

determine a second amount of time in which the ignition was turned off;

determine a temperature of the motor using the function and the boundary condition when the amount of time for which the ignition has been turned on is less than a predetermined threshold; and estimate the temperature of the motor to be equal to a temperature of the motor coolant when the second amount of time is greater than a second predetermined threshold.

9. The vehicle of claim 8, wherein:

the memory is further configured to store a thermal model; and the processor is further configured to determine the temperature of the motor using the thermal model when the amount of time for which the ignition has been turned on is greater than the predetermined threshold.

10. The vehicle of claim 8, wherein the boundary condition comprises an ambient temperature from when the ignition was turned off.

11. The vehicle of claim 8, wherein the motor is cooled by a motor coolant, and the boundary condition comprises a temperature of the motor coolant from when the ignition was turned off.

12. The vehicle of claim 8, wherein the motor comprises a stator and a rotor, and the control system further comprises:

a first sensor configured to measure a first stator temperature of the stator from when the ignition was turned off;

a second sensor configured to measure a first rotor temperature of the rotor from when the ignition was turned off; and a third sensor configured to measure an ambient temperature from when the ignition was turned off;

wherein the processor is further configured to:

determine a current rotor temperature of the rotor using a first function, the first function using the second amount of time, the first rotor temperature, the ambient temperature, and a rotor thermal time constant; and determine a current stator temperature of the stator using a second function, the second function using the second amount of time, the first stator temperature, the ambient temperature, and a stator thermal time constant.

13. The vehicle of claim 8, wherein the motor comprises a stator and a rotor and is cooled by a motor coolant, and the control system further comprises:

a sensor configured to measure a first motor coolant temperature from when the ignition was turned off and a second motor coolant temperature from when the ignition is turned on;

wherein the processor is further configured to:

determine a current rotor temperature of the rotor using a first function, the first function using the second amount of time, the first motor coolant temperature, the second motor coolant temperature, a rotor thermal time constant, and a motor coolant thermal time constant; and determine a current stator temperature of the stator using a second function, the second function using the second amount of time, the first motor coolant temperature, the second motor coolant temperature, a stator thermal time constant, and the motor coolant thermal time constant.

* * * * *